Jan. 23, 1973  G. E. KAYE  3,712,835
RESERVE CELL WITH MODULAR CONSTRUCTION
Filed Oct. 23, 1970

INVENTOR.
Gordon E. Kaye
BY
ATTORNEY

United States Patent Office 3,712,835
Patented Jan. 23, 1973

3,712,835
RESERVE CELL WITH MODULAR CONSTRUCTION
Gordon E. Kaye, Irvington, N.Y., assignor to P. R. Mallory & Co., Inc., Indianapolis, Ind.
Filed Oct. 23, 1970, Ser. No. 83,370
Int. Cl. H01m 21/10
U.S. Cl. 136—114                                       8 Claims

ABSTRACT OF THE DISCLOSURE

A reserve cell having a housing with two compartments separated by a central partition, with cell electrodes to be inserted into one compartment, and an electrolyte vial assembly into the second compartment, with associated means for fracturing the vial and forcing the electrolyte into the first mentioned compartment.

---

Figure 1:
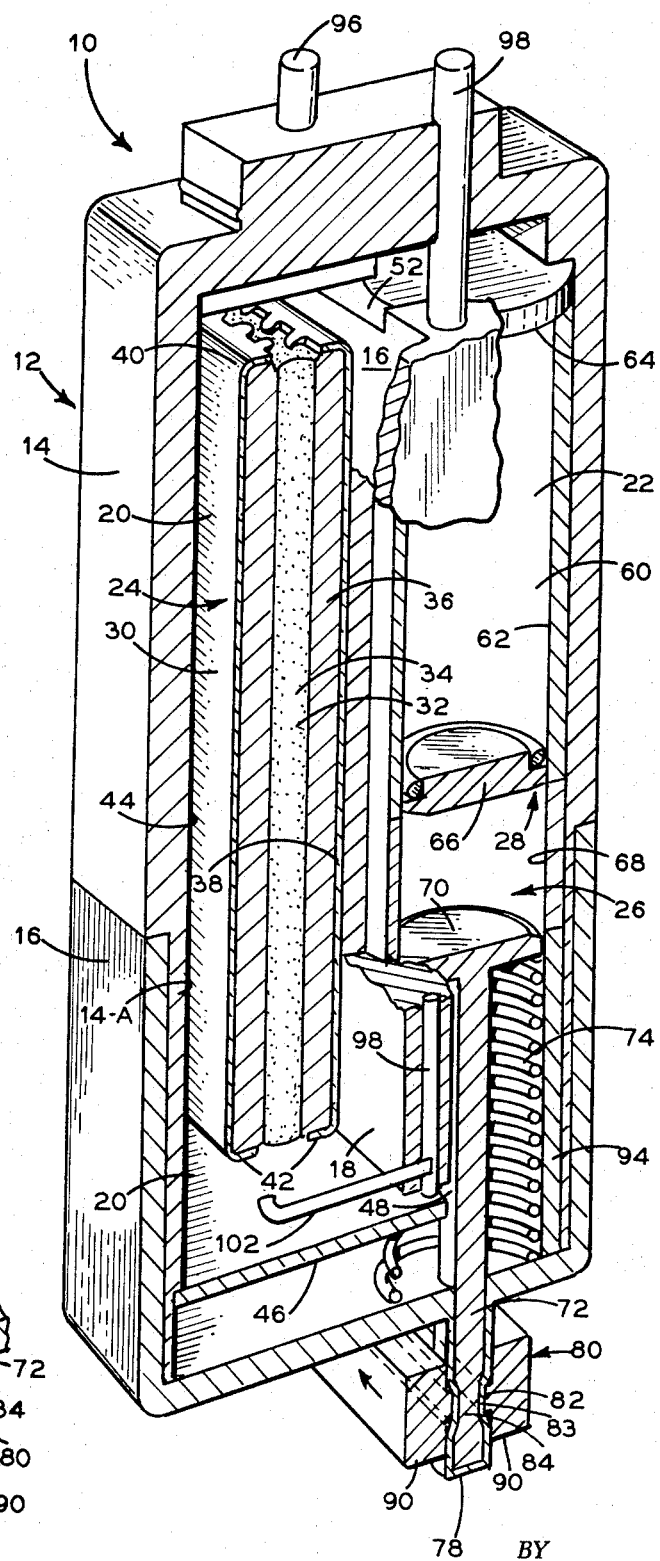

This invention relates to a reserve type primary electric cell utilizing a caustic electrolyte in which the electrolyte is confined and isolated in a confined space, or vial, as long as the cell is not desired to be activated, with arrangements provided for fracturing and opening the vial or confined space to release the electrolyte to enable it to move into the activating area between the electrodes of the cell, when activation and use of the cell is desired.

When conventional primary batteries or battery cells, in active condition, are stored, as in inventory, to be available for subsequent usage when desired, the nature of the electrodes and the chemical electrolyte is such as to establish chemical reaction, even though no electrochemical action is being initiated and stimulated by demand on the battery or cell by an external circuit for electrical energy. Consequently, when any electrical battery or cell is stored, as in inventory, for some period of time before it is called upon for use, a certain amount of deterioration may take place during such storage and before the battery or cell is called upon for energy. As a result, the battery or cell may be partially depleted and may not have the full voltage or energy content which it is intended to have and should have for the use for which it has been designed, and to which it is applied.

Further, since such individual primary cells, or batteries, including a plurality of primary cells, are essentially throwaway units when their energy has been fully utilized, it is a continual problem to design and manufacture primary batteries and cells as economically as possible, since they are not intended to be recharged.

Thus, there are two basic problems involved in the design and manufacture of such primary batteries and cells, namely, to make the battery or cell as economically as possible, and to design and make the cell available with its full voltage and energy content when needed, irrespective of the length of time during which the cell or the battery has been stored on the shelf awaiting use. Thus, a problem of shelf life, which has heretofore been a major problem in connection with such battery or cells, has been solved to a great extent by the reserve cell concept, which holds the cell in inactive condition, by keeping the electrolyte isolated from the cell structure proper until the cell or battery is to be activated and put in use.

Thus, the problem of economy still remains a substantial problem with a subsidiary problem of proper design still confronting the designer, to design an economical cell or battery structure, in which the electrolyte may be properly isolated, with the cell kept in an inactivated state, as long as the cell or battery is stored or kept on the shelf awaiting use, but with the design of the cell or battery made such as to permit the cell or battery to be simply and easily activated by suitably releasing the electrolyte from its confining space or vial so the electrolyte can be introduced into the operating space of the cell to enable the cell structure and electrolyte to operate and function as required.

Thus, the primary object of the invention is to provide a cell or battery structure which is economical to make; which is simple and economical to assemble in manufacture; and which is constructed to hold the electrolyte in confined position and condition to keep the cell inactive until desired for use; and to enable the cell to be activated by a simple manual operation for releasing the confined electrolyte, and by then directing the electrolyte into the operating space of the cell, between the electrodes.

Another object of the invention is to provide a cell or battery structure, so designed as to permit simple and economical modular assembly of the cell, with the electrode assembly as one modular unit, and with the electrolyte vial and its control assembly as a second modular unit, whereby the two modules of the cell may be independently and separately constructed in free space, without any physical obstructions, and then easily and readily assembled, in a housing or casing of the cell, as complete individual modules or sub-assemblies, to constitute a reserve type cell in inactive condition with integral means provided on the cell to convert the inactive reserve cell into an active operating cell.

In a preferred modification embodying the present invention, the housing of the cell is made as a simple inexpensive plastic cup with two chambers separated by an intermediate partition. As electrode assembly including cathode and anode electrodes spaced by a suitable spacer or barrier, and a depolarizer material is inserted into one compartment of the housing. Into the other compartment of the housing is inserted a modular assembly including a plastic vial containing the electrolyte for the cell and a spring actuable piston, that is normally restrained with a suitable detent and is operable at will, on release, to fracture the vial and to then force the electrolyte into said electrode compartment into the space between the cathode and the anode electrodes to activate the cell and to render the cell electrically operative. The spring is compressed and there held in compression during assembly, and while in storage, until its activation is desired. The cell is thus activated, when desired, by a suitable release handle, external of the casing, to release the spring and its associated piston, to force the electrolyte out of its storage vial, and into the electrode compartment to activate the cell.

Figure 2:
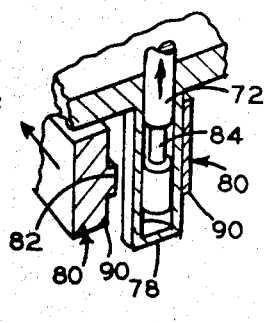

Other features of the invention, and the details of construction, and the manner of assembly and the operation of the cell, are described in the following specification, in connection with the accompanying drawings, in which:

FIG. 1 is a front elevational view in perspective with a front wall of the casing of the cell removed to expose the inner details of construction and assembly, and with the release handle in detent position; and FIG. 2 is a schematic perspective view of the fork-shaped release handle in release position to release the piston rod and to permit the compressed spring to actuate the piston to fracture the electrolyte vial and force the electrolyte into the electrode chamber.

As shown in the drawings, particularly in FIG. 1, a reserve cell 10 constructed in accordance with the principles of this invention is shown as comprising a plastic housing 12 having an upper portion 14 and a lower or closing portion 16. The upper portion of the housing is constructed to have an inner wall 18 which sub-divides the space within the upper portion housing 14 into two compartments of chambers 20 and 22. The chamber 20 receives and accommodates a modular electrode assembly 24, and the compartment 22 receives and accommodates a modular assembly including an electrolyte and control assembly 28.

The modular electrode assembly 24 includes a cathode conductor plate 30, a cathode depolarizer strip 32 of manganese dioxide, a porous separator barrier 34 to receive and hold the electrolyte, and an anode 36 consisting essentially of a body of amalgamated mercury treated zinc powder and graphite compacted into a self-supporting plate structure with a backing metallic plate 38 of zinc metal. Those two metallic cathode and anode plates 30 and 38 may be bent over at their top and bottom ends, as indicated at 40 and 42, to retain the depolarizer material 32, and the amalgamated zinc powder 36, in position against casual displacement.

That modular electore assembly 24 is preferably made of a dimension to fit snugly into the compartment space 20 between the inner partition wall 18 and the side wall 44. The bottom or lower end of the chamber 20 is then suitably closed by an inner cover 46 to provide a closure and seal for the lower end of the compartment 20, except for a small air vent passage 48, adjacent inner cover 46, between the two compartments, namely compartment 20 and compartment 22, for later free air passage, to prevent cushioning when the electrolyte is later transferred into compartment 20. The upper end of the middle partition wall 18 is also provided with a transverse passage 52 at its upper end to permit communication between the upper ends of the two compartments 20 and 22, to serve as a conduit passage for transfer of the electrolyte from the electrolyte chamber 22 into the electrode chamber 20 containing the cell electrode assembly 24, as will be explained in more detail below.

As shown in detail in FIG. 1, the piston rod 72 has a reduced neck section 84, into which the detent portions 83 of the two opposite side walls of the hollow boss 78 are pressed from both sides by bosses 82 on the tines 90 of the fork-shaped release handle 80. The handle is essentially a U-shaped clip with an operating extension handle.

In the assembling of the reserve cell 10, the piston rod 72 is extended axially through the spring 74, and into the tower or hollow boss 78 of the bottom cover cup 16 while the spring is seated and confined within a hollow guide cylinder 94 disposed in appropriate position in the bottom cover cup. The guide cylinder 94 is of appropriate dimension to fit snugly within the apron extension 14–A, when the housing 12 is completely assembled, and serves to hold the compression spring 74 from lateral bulging that could prevent proper re-expansion when the piston rod is released.

When the spring 74 is assembled and compressed, the piston rod 72 is locked in restrained position by the U-shaped release handle 80, which is pressed onto the hollow boss or tower 78, as in FIG. 2, to deform the two side walls and press them inwardly to form two detents 84 to press into the necked portion 86 of the piston rod 72, and thus hold the piston rod 72 against the movement by the compressed spring 74. While the spring is thus restrained, the electrolyte remains in its vial and the cell remains inactive.

When the cell is to be rendered active, the release handle 80 is removed. The spring force presses on the piston head and pulls the piston rod up and out of its restrained position, to cause the rupture of the vial ends and the forcing of the electrolyte into the electrode compartment 20. As the piston head 70 rises it is guided by its sleeve 94 into the co-axial sleeve 68.

The guide sleeve 68 has the same internal diameter as the guide cylinder 94, so the piston head 70 is held in its co-axial path in forward movement, when propelled by the spring 74, to strike and fracture the bottom wall 66 of the electrolyte vial or cylinder 62. The force of impact of the piston head on the bottom wall 66 is hydraulically transmitted to the top frangible wall or diaphragm 64, to fracture that diaphragm 64, and the continued movement of the piston 70 serves to force the electrolyte out of the vial 60 up through the connecting passage 52 into the electrode compartment 20 to enter the absorbent separator and be available to serve as an ionic conductor between the two electrodes 30 and 38.

In order to make the cell 10 available as a plug-in unit, two terminal conductors 96 and 98 are provided, disposed mainly in the body of the main portion 14 of the housing 12, and extending longitudinally through the length of the partition wall 18, in spaced relation, as indicated in FIG. 2, with the outer terminal ends extending beyond the top outer end of the housing. The lower inner ends of the two terminal conductors are connected to the lower ends of the anode and cathode electrode terminals 30 and 38, through suitable connector strips 102, of which only the front one 102 is shown connected to the lower end of terminal conductor 98 and electrode plate 30. A similar connector strip is connected between the lower end of terminal conductor 96 and electrode plate 38, not visible in FIG. 2. The terminals 96 and 98 may take any form for simple electrical connection, or they may be shaped and positioned to serve as prongs to fit into an electrical receptacle.

By the modular construction here shown, the several elements may be readily assembled as sub-assemblies on a bench and then assembled into full final assembly as shown. The details of construction and arrangement may be modified without departing from the spirit and scope of the invention as defined in the claims.

What is claimed is:

1. A reserve cell comprising a hollow cup-shaped housing closed at one end and open at the other end, and having a central partition wall sub-dividing the space within the housing into two parallel elongated compartments; means in one compartment constituting the two electrodes and cooperating elements of an electric cell except for the electrolyte; means in said other compartment constituting a frangible sealed vial containing a volume of electrolyte suitable to render the electric cell in said one compartment operative when introduced into said one compartment; means for releasing said electrolyte from said vial and introducing said electrolyte into said one compartment to render said cell elements operative, said means consisting of a compressible spring and an associated piston; means external of said housing and operative through a wall of said housing to cause the release of said electrolyte from said vial for introduction into said one compartment containing the cell electrodes, said means comprising a release handle; an outer cover to co-axially slip-fit over the open end of the said cup-shaped housing; means supported within said outer cover for supporting and holding said piston and compressible spring in position as a unit to permit modular assembly of said piston and said spring in their compartment when said outer cover is placed in closing position over the open end of said cup-shaped housing; means sealing and holding said outer cover on said cup-shaped housing, and means supported on the outside of said outer cover for releasably holding said spring in compressed position.

2. A reserve cell, as in claim 1, in which
said housing has a formed outer wall at its closed end;
a pair of outer electrode terminals extend through said closed outer wall an internally are electrically connected to said respective two electrodes of said cell, with one electrode terminal connected to the upper or front end of one electrode of said cell and the other electrode terminal electrically connected to the lower or back end of said other electrode of said cell.

3. A reserve cell as in claim 2, in which
an electrical conducting element is disposed longitudinally within said partition wall with the upper or front end of said conducting element electrically connected to one of said outer electrode terminals and the lower or back end of said electrical conducting element is electrically connected to the lower end of one of said cell electrodes;

and the other of said outer electrode terminals is connected to the other cell electrode.

4. A reserve cell, as in claim 1, in which said means for releasing said electrolyte includes means for fracturing said vial and for then forcing said electrolyte out of said vial and into the adjoining compartment containing the cell components.

5. A reserve cell, as in claim 4, in which said vial fracturing means includes a loaded compression spring held in compressed condition by a detent means;

and said means external of the housing serves to release said detent means to release said spring.

6. A reserve cell, as in claim 4, in which said vial is substantially a hollow cylinder filled with said electrolyte and having two closed frangible end walls;

and said means for releasing said electrolyte includes a piston element for directly fracturing one frangible end wall of said vial and then hydrostatically pressuring the electrolyte to fracture the second end wall and to force the electrolyte out through said fractured second end wall and into the adjoining compartment containing the cell components.

7. A reserve cell, as in claim 6, in which said cell compartment is closed at its originally open or back end by an inner cover element;

and said central partition wall is provided with one opening at its top or front end to serve as a transfer package for the electrolyte from the electrolyte compartment to the cell compartment, and said partition wall is provided with a small second opening at the bottom or back end of said central partition wall to serve as an air vent for air from the cell compartment to the adjoining compartment at the rear of the piston to prevent vacuum hold on said piston when the piston is released to act upon said vial.

8. A reserve cell, as in claim 1, in which said outer cover embodies an externally closed hollow extending cylindrical protuberance of easily deformable plastic material supported on the end wall of said outer cover;

a metal plunger fitting into said protuberance with an easy sliding fit and extending backward into the electrolyte compartment to a said movable piston, and having a necked portion in said deformable protuberance;

and a release handle for engaging said outer protuberance in one position to temporarily deform a wall portion of said protuberance to lock into said necked portion of said metal plunger to retain the metal plunger in detent position to hold the compression spring in compressed condition, said release handle being movable to a second position to relieve and release the temporarily deformed material in the wall of said protuberance from said necked portion of said metal plunger to enable said plunger to be actuated by said compressed spring to fracture said electrolyte vial and to force said electrolyte into said cell compartment.

References Cited

UNITED STATES PATENTS

| | | | |
|---|---|---|---|
| 2,502,723 | 4/1950 | Harriss | 136—113 |
| 3,516,869 | 6/1970 | Broglio | 136—114 |
| 3,437,528 | 4/1969 | Musselman | 136—90 |
| 3,481,791 | 12/1969 | Orsino | 136—113 |
| 3,222,225 | 12/1965 | Amiet et al. | 136—114 |

WINSTON A. DOUGLAS, Primary Examiner

C. F. LeFEVOUR, Assistant Examiner

U.S. Cl. X.R.

136—90